United States Patent [19]

Emposimato et al.

[11] Patent Number: 5,281,273

[45] Date of Patent: Jan. 25, 1994

[54] APPARATUS FOR MARKING RECYCLABLE BOOKS

[75] Inventors: Michael Emposimato, Madison; George Carlson, Florham Park, both of N.J.

[73] Assignee: Fail-Safe Bookmarker, Inc., Mountainside, N.J.

[21] Appl. No.: 887,157

[22] Filed: May 21, 1992

[51] Int. Cl.[5] ............................................. B05C 1/02
[52] U.S. Cl. ................................... 118/693; 118/694; 118/221; 118/225; 118/239; 118/264; 198/560; 198/561
[58] Field of Search ............... 118/693, 694, 211, 221, 118/225, 264, 239, 246, 238, 500; 101/35; 198/560, 561

[56] References Cited

U.S. PATENT DOCUMENTS

| | | | |
|---|---|---|---|
| 948,011 | 2/1910 | Goldsmith | 118/239 |
| 997,672 | 7/1911 | Hawkes | 118/239 |
| 1,147,161 | 7/1915 | Goldsmith | 118/239 |
| 1,967,397 | 7/1934 | Cutler | 198/561 |
| 2,789,530 | 4/1957 | Fleischauer . | |
| 3,106,480 | 10/1963 | Baker . | |
| 3,319,601 | 5/1967 | Baker et al. . | |
| 3,738,260 | 6/1973 | Navi et al. . | |
| 4,025,671 | 5/1977 | Creamer . | |
| 4,080,896 | 3/1978 | McKay . | |
| 4,287,849 | 9/1981 | Walchhuetter . | |
| 4,332,193 | 6/1982 | Noyes . | |
| 4,332,213 | 6/1982 | Marino | 118/225 |
| 4,387,002 | 6/1983 | Knecht | 118/268 |
| 4,538,541 | 9/1985 | Zimmer . | |
| 4,656,939 | 4/1987 | Lassauskas et al. . | |
| 4,860,648 | 8/1989 | Beaver et al. . | |
| 4,962,721 | 10/1990 | Peek . | |
| 5,069,440 | 12/1991 | Lazzarotti et al. . | |

FOREIGN PATENT DOCUMENTS 1-96936  4/1989  Japan ................................. 118/694

*Primary Examiner*—W. Gary Jones
*Assistant Examiner*—Todd J. Burns
*Attorney, Agent, or Firm*—Lerner, David, Littenberg, Krumholz & Mentlik

[57] ABSTRACT

A method and apparatus for marking recyclable books permits the user to retain the recyclable value of the books while effectively deterring third-parties from reselling books which are intended to be recycled. The method includes transporting recyclable books past a designated marking location and marking at least a portion of the covers of the books with a distinguishing mark, and then transferring the marked books away from the marking location. The apparatus includes a marking device for marking the covers of the books, a transport device having a first and a second end for transporting the books past the marking device so that the covers of the books become marked thereby, and a removal device for moving the books away from the marking device after the covers of the books have been marked thereby.

15 Claims, 5 Drawing Sheets

APPARATUS FOR MARKING RECYCLABLE BOOKS

FIELD OF THE INVENTION

The present invention relates to a method and an apparatus for marking books. More particularly, the present invention relates to a method and an apparatus for marking recyclable books with an ink. Still more particularly, the present invention relates to a method and an apparatus for at least partially coating the covers of recyclable books with an indelible ink while leaving the pages of such books substantially, and preferably entirely, uncoated.

BACKGROUND OF THE INVENTION

Recycling is becoming increasingly important for the preservation of natural resources. Because of the enormous volume of books manufactured by various publishing companies throughout the United States, the commercial book recycling business has become an increasingly important part of overall recycling efforts. Publishers generate thousands of books each week that are deemed "non-sellable" for various reasons. Instead of selling these books to retailers, wholesalers or other distributors, the publishers sell them as scrap to private book recycling companies. At the recycler's plant, the covers are removed and the pages of the books are bundled for shipment to paper mills. The publishers rely on the recyclers to assure that the books are actually destroyed rather than resold in readable condition. The prohibited resale of these "non-sellable" books, intended for recycling, has become a problem of increasing magnitude in the book recycling industry. In this regard, the reputation of the book recycling industry has been damaged by some unethical recyclers who obtain shipments of the "non-sellable" books, intended for recycling, and then resell such books in readable condition.

Efforts have been made, by the publishers and private book recycling companies, to mark the "non-sellable" books at the publishers' warehouses, before shipment to the recycling plant, so as to discourage the unethical resale of such books. However, those efforts have been largely unsuccessful. In particular, a spray coating apparatus for spray coating entire lots of books with a dye composition, has been used. The spray coating device has presented various problems. Although the spray coating device does effectively coat and identify the "non-sellable" books so that they cannot readily be sold, it also significantly decreases the recycling value of the books. Books treated with the spray-coating dye composition absorb substantial amounts of liquid and thus increase in size and weight. It becomes extremely inefficient to prepare the books for recycling and to ship such treated books to paper recycling mills.

Moreover, the pages which absorb the spray-coating dye composition become partially or substantially dyed. Paper recycling mills are not eager to process dyed paper into pulp since additional chemical processing additives and steps are necessary to bleach out the dye. These additional processing steps and additives are costly and create environmental problems. Thus, the paper recycling mills pass this cost on to the book recyclers by "downgrading" the quality rating of the recycled paper from books. The paper mills offer the recyclers a much lower price per unit weight for dyed paper than for substantially undyed paper. The greater the amount of dye absorbed by the pages of the books, the less valuable the paper will be. Thus, if the books absorb too much of the spray coat composition, the paper mills often refuse to process the salvaged paper at all. In this case, the books are rendered completely useless for recycling purposes and must be discarded in a landfill at substantial expense. However, even if edges of the pages are slightly colored with a composition, the recycling mills will often "downgrade" the quality of the paper.

To avoid the downgrading problem, many of the recyclers refuse to process books treated by the prior art spray-coating method.

Thus, methods and apparatus for marking recyclable books which alleviate the inefficiencies and waste associated with conventional spray-coating methods are needed. Moreover, such devices and methods should be inexpensive, rugged and suitable for use by unskilled individuals. Presently, no known acceptable marking method and apparatus exists.

Other marking equipment and apparatus have been developed for other purposes. In U.S. Pat. No. 4,656,939 to Lasauskas et al, a marking device is disclosed which utilizes a revolving printer wheel to print indicia on the bottom surface of packages which pass along a horizontal conveyor surface and thereafter contact the printer wheel as shown in FIG. 6 of the '939 patent. The uppermost portion of the printer wheel is disposed in the same plane as the horizontal conveyor surface. The printer wheel is operably associated with the bottom surface of the packages so that the printer wheel is rotated by frictional engagement with the bottom surface of said package. The marking device of '939 patent would not be suitable for marking recyclable books, since the structure of the marking device requires the uppermost surface of the printer wheel to be disposed in the same plane as the conveyor surface. Such a structure would mark a portion of the edges of pages of the recyclable books.

U.S. Pat. No. 3,738,260 to Navi et al discloses an apparatus for printing indicia on the bottom surface of a plurality of moving containers. The apparatus includes a printing device disposed between a pair of conveyor belts.

U.S. Pat. No. 5,069,440 to Lazzarotti et al discloses an apparatus for sorting a plurality of stacked items and producing a singulated flow of the items by combining two or more adjacent conveyor belts operating at different speeds.

The present invention solves the aforementioned shortcomings of the prior art, and thus fulfills the needs of the industry by providing a simple and efficient method and apparatus for marking recyclable books without decreasing the recyclable value of such books.

SUMMARY OF THE INVENTION

One aspect of the present invention provides a method for marking recyclable books to deter the undesirable resale of such books. A method according to this aspect of the present invention includes the steps of transporting the books past a marking device. The marking device then marks at least a portion of the covers of the books with a distinguishing mark. Finally, the newly marked books are then transferred away from the marking device.

Preferably, the step of transporting the books comprises the steps of placing the books on the surface of a transport apparatus such as a conveyor system, a sliding chute system, or a combination thereof, and then transporting the books past the desired marking location. Additionally, it is desirable for the step of marking at least a portion of the covers of the books to include the step of applying a composition to the covers of the books so that the covers are at least partially coated with the composition, but at the same time, the pages of the books are left substantially uncoated, and preferably entirely uncoated, thus avoiding problems associated with the prior art spray coating method. Further, it is desirable for the step of transferring the marked books away from the marking location to include the steps of receiving the books after the books are marked at the marking location, and then moving the books away from such marking location.

In a particularly preferred method according to this aspect of the invention, the step of transporting the books and applying a composition to at least a portion of the covers of the books includes the steps of transporting the books off of a downstream end of a transport apparatus, such as a roller conveyor so that the books fall therefrom and contact an associated marking device, such as a plurality of roller-tip markers, whereupon the covers of the books are coated with an indelible ink dispensed by the plurality of roller-tip markers on such covers in the form of a plurality of stripes.

The structure of the marking apparatus used in connection with the method of the present invention preferably includes a marking device disposed at a predetermined spaced distance away from the downstream end of the transport apparatus and below the surface thereof so that the covers of the books will contact the plurality of roll-tip markers at a location away from the edges of the pages of the books. Thus, the step of coating the covers of the books according to this method of the invention permits the pages of the books to remain substantially uncoated, and preferably entirely uncoated. Thus, the problem of ruining the pages with a substantial amount of dye, as in the prior art spray coat method, is alleviated. Furthermore, if the pages are left entirely uncoated, as described in the most preferable method, the risk of a recycling mill downgrading the quality of recyclable paper is also alleviated. It is also desirable according to the preferred method of the present invention for the step of transferring the marked books away from the marking device to include the steps of receiving the books after they have been transported off the second end of the transport conveyor, and after the covers have been marked as described above, on a removal device, such as a second conveyor apparatus, and thereafter moving the books away from the aforesaid marking device.

As can be appreciated, the structure and operation of the apparatus associated with the present method can comprise a number of alternate embodiments. For example, the transporting apparatus may comprise a single conveyor apparatus including an endless conveyor belt, a system including multiple conveyors, a single sliding chute, a combination of a chute and a conveyor, a conveyor belt in combination with a conveyor having rollers thereon, and numerous other conveyor apparatus which are well-known in the art of transporting objects. Similarly, the structure and operation of the marking device situated at a designated marking location in accordance with the method of this aspect of the invention, can also comprise numerous embodiments. Such embodiments include a marking device having roller-tip marking instruments, felt-tip markers, selectively actuatable spraying devices, wheel marking devices, heat markers and numerous other embodiments including blade marking devices. Finally, the method of transferring the marked books away from the marking device can be conducted with one of several types of removal devices. For example, as described herein below, acceptable removal devices include conveyors, chutes, hoppers or any combination thereof.

Another aspect of the present invention provides an apparatus for marking recyclable books wherein the apparatus includes the combination of a marking device for marking the covers of the books, at least one transport device having first and second ends for transporting the books past the marking device so that the marking device can mark the covers of the books as the books are transported thereby, and a removal device for moving the books away from the marking device after the covers have been marked by the marking device.

As noted above, the transport device according to this aspect of the present invention can comprise any one of several alternate embodiments, including a conveyor system having at least one endless conveyor belt, a sliding chute, a conveyor apparatus having roller devices thereon, or a combination of one or more of the aforementioned transport devices. The marking device can also comprise a number of different embodiments, as described above, including roller-tip marking instruments for applying an indelible ink, felt-tip markers, wheel markers, selectively actuatable spraying devices, heat markers and other marking devices including various blade marking instruments. As can be appreciated, the removal device can also include one of several embodiments such as belt conveyors, chutes, hoppers or a combination of such devices, also generally described above.

In a particularly preferred arrangement, the transport device includes a conveyor apparatus having at least one endless conveyor belt thereon in combination with a roller conveyor. According to this aspect of the invention, the books are placed upon the conveyor apparatus and are then transported past the marking device whereupon the covers of the books become at least partially coated with a composition, while the pages are left substantially uncoated, and most preferably, entirely uncoated. The books are then delivered to a removal device, such as a second conveyor apparatus, and are effectively transferred away from the marking device. It is desirable for the transport device to include a singulating mechanism for sorting and unstacking books which may have become stacked due to the indiscriminate tossing of books upon the conveyor and the large volume of books placed thereon. Thus, the singulating mechanism will assure that most of the books transported on the conveyor apparatus will pass by the marking surface in single file, one book at a time. Preferably, this is accomplished by adjacently placing a slow conveyor belt and a fast conveyor belt in a side-by-side relationship. It is desirable to place the marking device between the transport conveyor and the removal device. Further, it is desirable for the marking device to include a marking surface which is disposed below the level of the surface of the transport conveyor so that the covers of the books will individually contact the surface of the marking device as the books fall from the downstream end of the transport conveyor.

In accordance with this preferred arrangement, it is also desirable for the marking device to comprise a reservoir for retaining a composition such as an indelible ink, a refill device connected to the reservoir for supplying and refilling the reservoir with such ink, a manifold also connected to the reservoir to provide a flow path for the ink from the reservoir through the manifold, and a plurality of marking members such as roller-tip markers which extend from a portion of the manifold to uniformly apply the ink to a portion of the covers of the books.

It is also desirable according to this aspect of the invention for the removal means to be arranged below the marking surface of the marking members and to comprise a second conveyor device having a first end and a second end for transporting the books away from the marking surface after the covers have been at least partially coated thereby.

The preferred marking apparatus in accordance with this aspect of the present invention effectively permits the user to indiscriminately and continuously toss a plurality of books onto a transport conveyor and to effectively coat at least a portion of the covers of the books while leaving the pages substantially uncoated, and preferably, entirely uncoated, and thereafter moving the books away from the marking device so that additional books can continue to be individually and efficiently coated. Thus, the preferred embodiment of the marking apparatus according to the present invention permits books to be identified to discourage the resale of books intended for recycling, and at the same time, maintains the recyclable value of such books. The simplicity and effectiveness of the marking apparatus according to the present invention is both environmentally and economically desirable. Thus, by selectively coating a portion of the covers of the recyclable books and leaving the pages substantially or entirely uncoated in accordance with the present invention, the prior art problems of excessive size and weight due to absorption of the spray coating composition are eliminated. The time consuming and expensive process of separating the undesirable dye from the paper pulp at the paper mill is eliminated. The risks of downgrading the paper quality or of rendering the books unrecyclable due to the application of excessive dye are eliminated. Therefore, the recyclable value of the books is enhanced.

These and other objects of the present invention will be more clearly understood when read in conjunction with the detailed description and the accompanying drawings which follow.

DETAILED DESCRIPTION OF THE PREFERRED EMBODIMENTS

Figure 1:
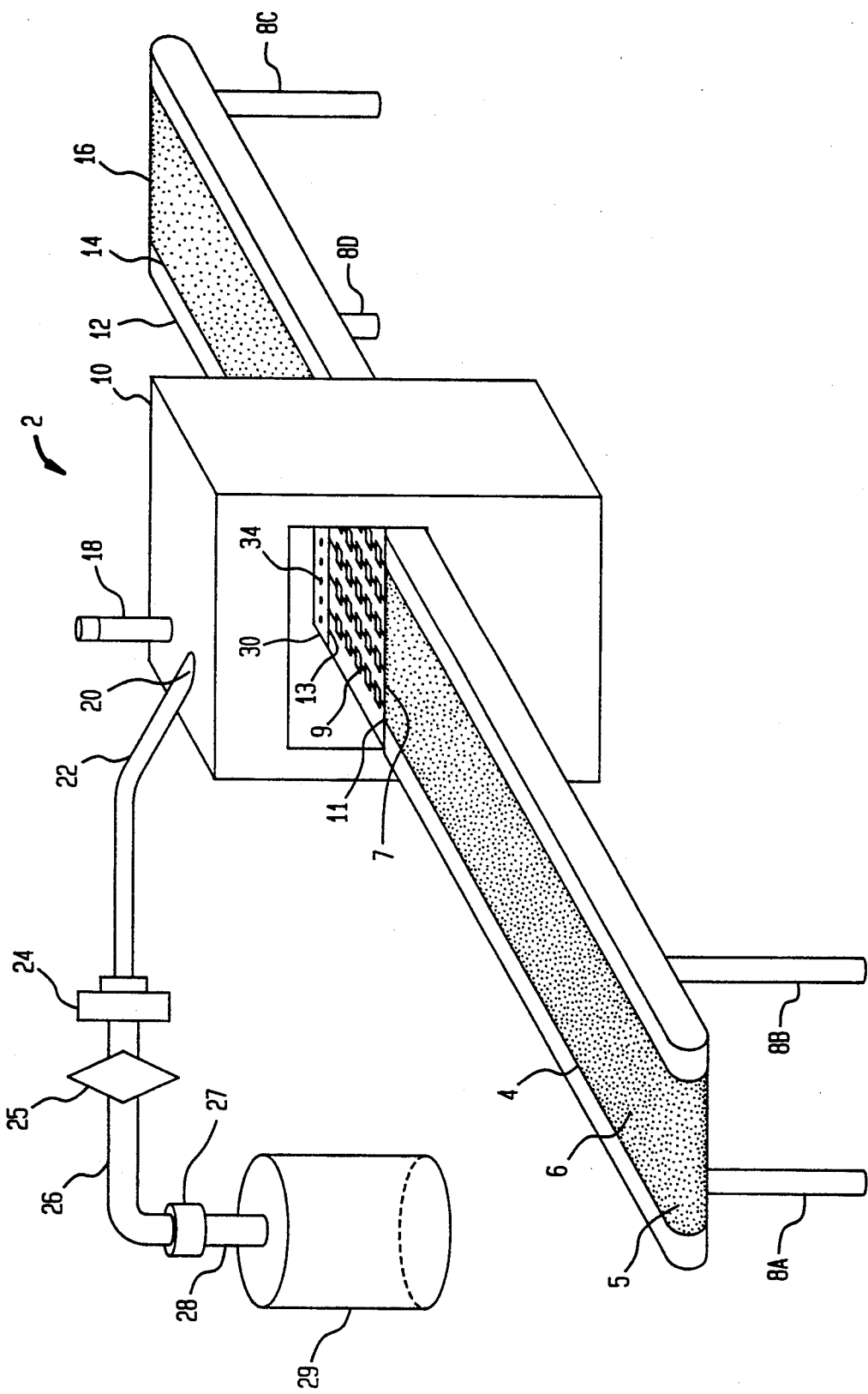
FIG. 1 is a perspective view of marking apparatus in accordance with one embodiment of the present invention.

An apparatus generally designated 2 in accordance with one embodiment of the present invention includes a first transport conveyor 4 having a first end 5 and a second end 7 disposed downstream of said first end and an endless conveyor belt 6 extending from first end 5 to second end 7. Endless conveyor belt 6 is arranged to run from first end 5 toward downstream second end 7 to transport books placed thereon. A second transport conveyor device 9 comprising a plurality of roller mechanisms is arranged to receive books as they are transported off of downstream end 7 of the first transport conveyor 4. As clearly shown in FIG. 1, roller conveyor 9 includes an upstream end 11 arranged adjacent downstream end 7 of the first transport conveyor 4, and a downstream end 13.

Figure 2:
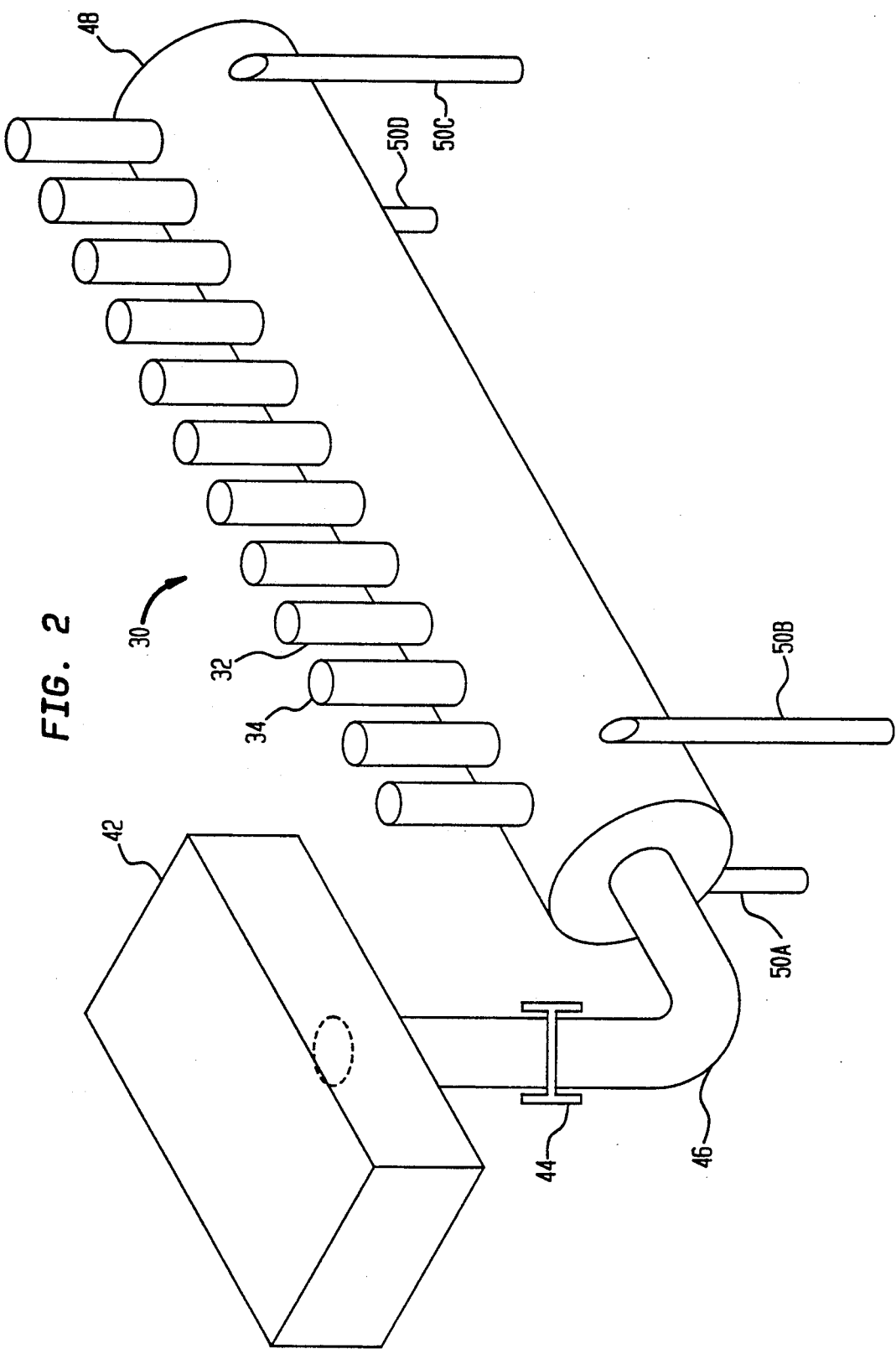
FIG. 2 is a perspective view of a component of the apparatus of FIG. 1.

Apparatus 2 further comprises a marking device generally designated 30 as shown in FIGS. 1 and 2. Marking device 30 includes a reservoir 42 for retaining a supply of ink, preferably an indelible ink. Marking device 30 further includes manifold 48 having a manifold conduit 46 which provides a passageway between reservoir 42 and manifold 48 through which the ink can flow. Valve 44 is attached to manifold tube 46 to control the flow of ink therethrough. Ink is supplied from manifold 48 to a plurality of marking members 32 having a roller-tip applicator 34 thereon, all of which can best be appreciated as shown in FIG. 2. Typically, each of the plurality of marking members 32 extend approximately 6 inches from manifold 48 to the tip of applicators 34. Desirably, an absorbent felt material is disposed within manifold 48 and extends into the plurality of marking members 32 up to roller-tip applicators 34. The absorbent felt material facilitates the even distribution of ink from manifold 48 to the plurality of roller-tip applicators 34.

As also shown in FIG. 2, manifold 48 comprises a cylindrical body manufactured from any non-reactive material such as non-reactive metals and plastics. It is desirable for the manifold 48 to have an outer diameter of approximately 1.25 inches and an inner diameter of approximately 1.0 inch. of course, the manifold dimensions can vary widely and still remain within the scope of the present invention. Further, manifold conduit 46 and reservoir 42 similarly comprise non-reactive material, such as aluminum, which is compatible with the indelible ink stored therein.

Optionally, legs 5OA–50D can be provided and extend from manifold body 48 to support the marking device 30 in a desired location adjacent second end 7 of transport conveyor 4 as shown in FIGS. 1 and 2.

Figure 3:
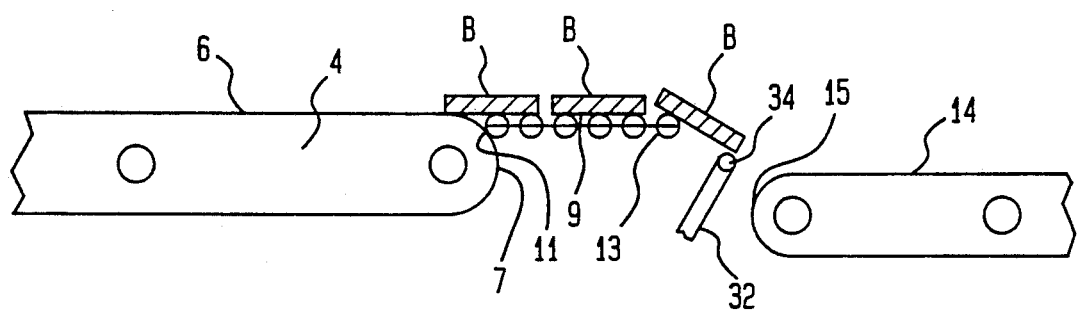
FIG. 3 is a partially broken away side elevational view of the apparatus of FIG. 1.

As best seen in FIG. 3, the plurality of roller-tip applicators 34 are disposed below the plane of the surface of endless conveyor belt 6. Further, the plurality of marking members 32 and in particular, the roller tip applicators 34, are disposed at a predetermined distance below the plane defined by the surface of endless conveyor belt 6 and additionally, roller-tip applicators 34 are arranged at a predetermined spaced distance from the downstream end of transport conveyor 4. In a preferred embodiment, the plurality of roller-tip applicators 34 are arranged approximately 1 inch below the surface of the roller conveyor 9. The plurality of roller-tip applicators 34 are also preferably arranged approximately 1 inch away from the downstream end 13 of the roller conveyor 9. In determining the distance that roller-tip applicators 34 will be placed below the surface of roller conveyor 9 and away from the downstream end thereof, it is necessary to take into consideration the surface speed that endless conveyor belt 6 will be travelling at as well as the size and weight of the books being transported thereon. The tolerances in determining the best location for roller-tip applicators 34 are generally large enough to accommodate books of various sizes and weights so that only the covers of such books will be marked during operation of apparatus 2. Thus, recyclable books, such as book B, transported by endless conveyor belt 6 from first end 5 toward second end 7, will be received on upstream end 11 of roller conveyor 9. As additional books are transported in the same manner, they will push each other over the roller mechanisms of roller conveyor 9 toward downstream end 13 thereof. The books will eventually fall off the downstream end 13 of the roller conveyor 9 so that the cover of book B, but not the pages thereof, will contact the roller-tip applicator 34 and thereafter, will be received on the surface of removal conveyor belt 14 of removal conveyor 12. As can be appreciated, in this preferred embodiment of the present invention, the pages of the books will remain entirely unmarked during the aforementioned marking operation. Of course, there may be some small degree of error during the operation of the present invention and thus, a small percentage of the books may inadvertently receive ink marks on the edges of the pages as well as on the covers thereon. These "inadvertent" marks may occur, for example, if some of the books placed upon the transport apparatus are too large or if the transport apparatus malfunctions and operates at a slower speed than is desired. However, such "inadvertent" marking will rarely occur during operation of apparatus 2.

Figure 5:
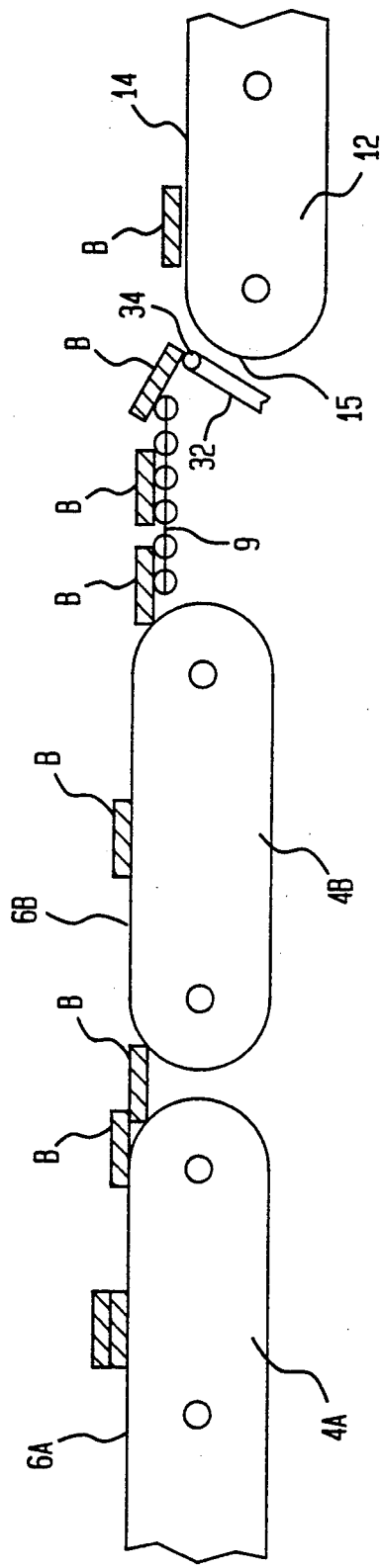
FIG. 5 is a side perspective view of a singulating device used in further embodiments of the present invention.

Marking apparatus 2 preferably also comprises a removal conveyor 12 having an endless conveyor belt 14 thereon. As shown in FIG. 3, endless conveyor belt 14 runs from an upstream end 15 toward downstream end 16 so that books placed thereon will be transported toward end 16. As shown in FIGS. 1, 3 and 5, marking device 30 is arranged between roller conveyor 9 and removal conveyor 12. Additionally, the surface of endless conveyor belt 14 in preferably disposed below roller-tip applicators 34 of marking members 32, which in turn, as described above, are arranged below the surface of roller conveyor 9. Typically, the surface of the removal conveyor 12 is displaced approximately 12 inches below the top surface of roller-tip applicators 34. As with the other dimensions described above, the 12 inch distance between roller-tip applicators 34 and the surface of removal conveyor 12 can be altered while still remaining within the scope of the present invention.

Preferably, housing 10 is arranged to provide structural stability to the entire marking apparatus and additionally, provides protection to marking device 30. The housing 10 includes large passageways to permit the books to enter therein, prior to being marked, and to leave therefrom after the covers of the books have been marked by marking device 30. In a preferred embodiment, roller conveyor 9 is arranged within housing 10 and is mounted therein so that upstream end 11 is adjacent downstream end 7 of transport conveyor 4. Further, the surface of roller conveyor 9 defined by the roller mechanisms thereon is arranged in the same plane as the surface of endless conveyor belt 6.

As shown in FIG. 1, housing 10 includes optional aperture 20. The downstream end 22 of a conduit 26 extends through aperture 20 into reservoir 42. The upstream end 28 of conduit 26 is connected to a drum 29 containing a reserve of ink. Pressure regulator 27 is disposed in the vicinity of downstream end 28 of conduit 26 to control the pressure of the ink which flows therethrough. A pump 25 is connected to conduit 26 at a location downstream from pressure regulator 27. Relay 24 is also disposed about conduit 26 at a location between pump 25 and downstream end 22.

A sensor switch (not shown), such as a float switch, is disposed in reservoir 42 to complete an electrical circuit when it reaches a first predetermined level, i.e., when the ink level in reservoir 42 becomes too low. Thus, the triggering of the float switch is responsible for actuating relay 24 which in turn actuates pump 25 to provide additional ink from drum 29 through upstream end 28 of conduit 26 and further downstream through end 22 and into reservoir 42. An optional warning light 18 is disposed on housing 10 and is actuated when the float switch is triggered upon reaching a second predetermined level, as will be the case when drum 29 runs out of ink or if a dispensing component such as pump 25 or relay 24 malfunctions. The warning light 18 will then provide a warning signal.

Figure 4:
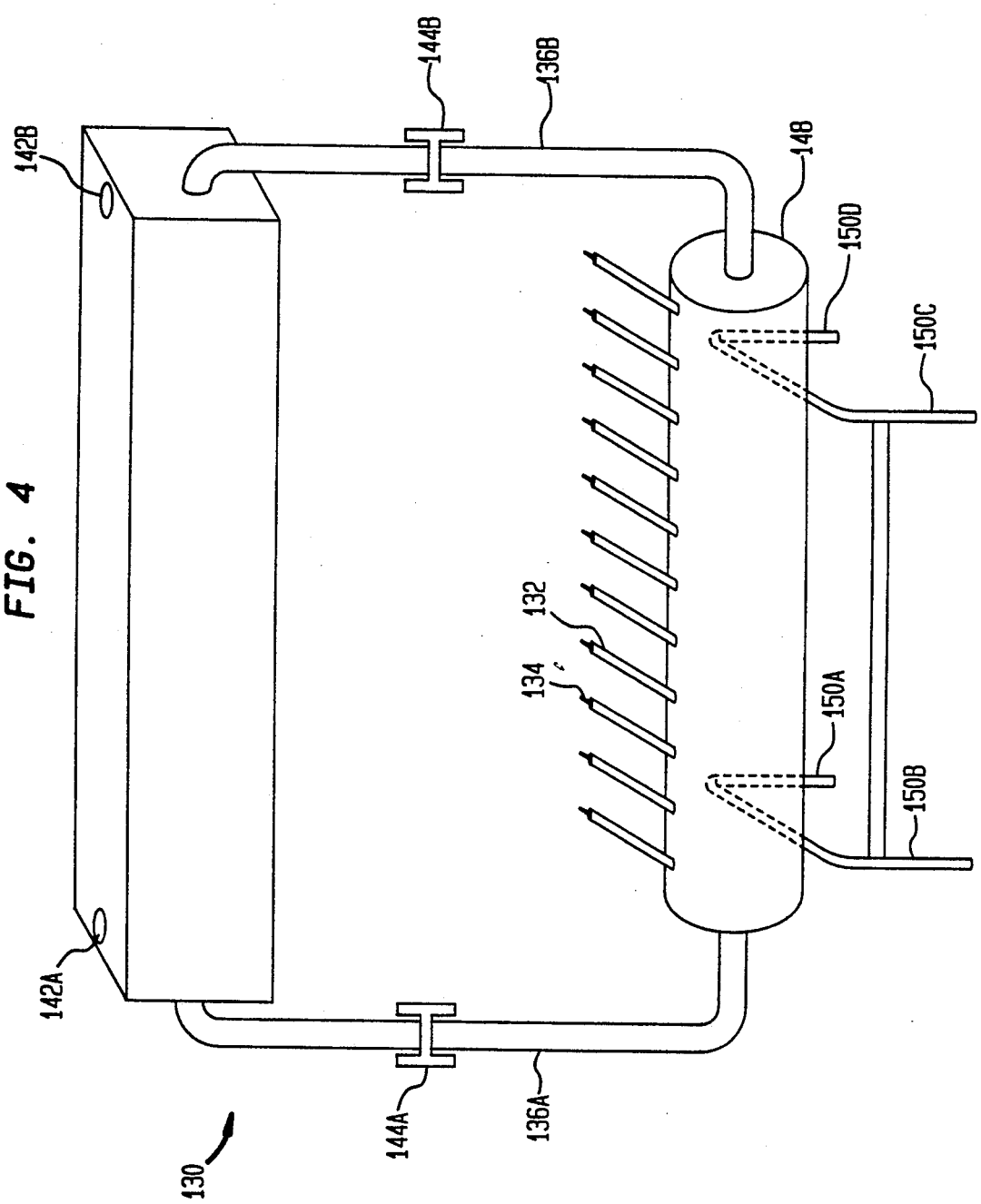
FIG. 4 is a perspective view of a second marking device in accordance with a second embodiment of the present invention.

FIG. 4 illustrates a second embodiment of the marking device 30 shown in FIG. 2. The second embodiment of the marking device generally designated 130 in FIG. 4, has a substantially similar structure and operation to the marking device 30 shown in FIG. 2. Thus, marking device 130 includes reservoir 142 for retaining a supply of ink and having refill locations defined by apertures 142A and 142B. Marking device 130 further includes manifold conduits 136A and 136B which provide a passageway through which the ink can flow from reservoir 142 through valve members 144A and 144B to manifold 148. Ink is then supplied from manifold 148 to a plurality of marking members 132 which extend therefrom and have roller-tip applicators 134 disposed at their outermost surfaces, all of which can best be appreciated as shown in FIG. 4. As in marking device 30 shown in FIG. 2, marking device 130 includes optional legs 150A-D for providing stability and support at the desired location.

Although the preferred embodiments of marking devices 30 and 130 are described as including a plurality of roller-tip applicators 34 and 134 disposed on marking members 32 and 132, respectively, it should be appreciated that the plurality of marking members can also comprise felt-tip marking members. Additionally, marking devices 30 and 130 are merely preferred embodiments included in the entire marking apparatus of the present invention. It should be understood that the present invention is not limited to marking devices having a plurality of marking members as shown in FIGS. 1-5 of the present invention, and therefore, the marking devices may also comprise wheel-type marking devices selectively actuatable spraying devices, laser-type marking devices, marking devices utilizing blade members, and the like. However, regardless of the specific type of marking device selected, it is always preferable to mark the covers of the recyclable books while leaving the pages substantially free of any composition, and most preferably, leaving the pages entirely free of any composition.

As shown in FIG. 5, an optional singulating device comprising two transport devices 4A and 4B having endless conveyor belts 6A and 6B thereon respectively, can be used to "singulated" a plurality of books B to assure that the books are transported one at a time as they pass marking device 30. In this regard, endless conveyor belt 6A is arranged to rotate at a slower speed than endless conveyor belt 6B. Thus, the books B are "singulated" as they are transferred from endless conveyor belt 6A to endless conveyor belt 6B. The relationship between transport conveyor 4B, roller conveyor 91 marking device 30 and removal conveyor 12, is identical to the relationship of the respective parts shown in FIG. 3.

According to the method of the present invention, books such as book B, shown in FIG. 3, are placed upon endless conveyor belt 6 of marking apparatus 2 shown in FIG. 1. The books are then transported from first end 5 of transport conveyor 4 toward downstream second end 7. As book B passes second end 7 it is transferred onto the surface defined by the roller mechanisms at upstream end 11 of roller conveyor 9. As additional books are transported in the same manner, they push each other along the surface of roller conveyor 9 toward downstream end 13 thereof. Eventually, a book such as book B is pushed off of downstream end 13 of roller conveyer 9 and falls therefrom, thus contacting the plurality of roller-tip applicators 34 of marking members 32, all of which is clearly shown in FIG. 3. Book B then falls onto endless conveyor belt 14 of removal conveyor 12 and is thereafter transported away from marking device 30 toward downstream end 16 of removal conveyor 12.

As discussed above, when any particular book B is transported off downstream end 13 of roller conveyor 9 it contacts the plurality of roller-tip applicators 34. Thus, a plurality of ink stripes are applied to the cover of such book. It is preferable to use an indelible ink so that the ink stripes cannot be readily removed from the covers without damaging same. It is most preferable to position the roller-tip applicators between roller conveyor 9 and removal conveyor 12, and further to position applicators 34 below the plane of the surface of endless conveyor belt 6, but above the plane of the surface of endless conveyor belt 14, all of which is clearly shown in FIG. 3. Thus, the present method provides steps to assure that the covers of recyclable books will be coated with a plurality of ink stripes, while the pages of the recyclable books will be left entirely uncoated. As discussed above, although it is most desirable to leave the pages of the recyclable books entirely uncoated, and indeed, in the overwhelming majority of situations, such result is accomplished by using the method and apparatus of the present invention, there may be a few instances in which a small percentage of the books will receive undesirable ink on the edges of the pages of same. Thus, also as noted above, the substantial majority of the time, the pages of the books will be left entirely uncoated while the covers of the books will be coated with a plurality of ink stripes.

The ink supply in reservoir 42 and manifold 48 of marking device 30 should be kept substantially full by supplying ink from drum 29 through supply conduit 26 and into reservoir 42 by means of pressure regulator 27, pump 25 and relay 24. In this regard, it is preferably for the ink applied to the covers of the books to be an indelible ink. However, both permanent and non-permanent inks can be used for marking the covers of the books in accordance with the method and apparatus of the present invention.

As noted above, the method and apparatus of the present invention permits ink to be applied to the covers of the books while the pages of the books are kept substantially, and preferably entirely, uncoated. Thus, when recyclable books are marked according to the method and apparatus of the present invention, the resultant ink coating will constitute only a minute fraction of the mass of the entire book. Accordingly, books coated in accordance with the method and apparatus of the present invention can be recycled without being subjected to time consuming and expensive additional steps of adding processing chemicals during recycling operations to remove a relatively large quantity of dye from the paper. Additionally, the risk of recycling mills unjustifiably "downgrading" the quality of paper due to ink or other composition coatings which appear on the edges of the pages of the books, is eliminated since the pages are not coated in any way whatsoever.

Although the present method and apparatus for marking books are useful when used at the publishers' warehouse before the books are shipped to the recycling plant, it should be appreciated that the present method and apparatus can be used in any warehouse or other desirable location. In some instances, it may be desirable to use the present method and apparatus at the recycling plant where the books can further be processed for shipment to the paper recycling mills.

While the foregoing description and figures are directed toward the preferred method and marking apparatus in accordance with the present invention, it should be appreciated that numerous modifications can be made to each of the individual steps of the method and components of the entire apparatus as discussed above, and are indeed encouraged to be made in the steps, materials, structure and arrangement of the disclosed steps and embodiment without departing from the spirit and scope of the present invention. Thus, the foregoing description of the preferred embodiments should be taken by way of illustration rather than by way of limitation of the present invention as defined by the claims set forth below.

We claim:

1. An apparatus for marking recyclable books having covers thereon and a plurality of pages, comprising marking means for at least partially coating the covers of said books with a composition while leaving the pages of said book substantially uncoated, said marking means having a marking surface, transport means having a transport surface and a first end and a second end for transporting said books past said marking means, and removal means for moving said books away from said marking means, wherein said entire marking surface is disposed below said transport surface and above said removal means, said books are transported past said second end of said transport means whereupon said books fall off said transport means so that said covers contact said marking surface and become at least partially coated thereby.

2. The apparatus of claim 1, wherein said transport means comprises at least one endless conveyor belt and a roller conveyor arranged adjacent said conveyor belt.

3. The apparatus of claim 2, wherein said transport means comprises singulating means for sorting through a plurality of books so that said books are transported past said marking surface one at a time.

4. The apparatus of claim 1, wherein said removal means comprises a removal conveyor means having a first end and a second end for transporting the at least partially coated books away from said marking surface.

5. The apparatus of claim 1, wherein said marking means comprises reservoir means for retaining an ink, refill means connected to said reservoir means for supplying and refilling said reservoir means with said ink, manifold means connected to said reservoir means for providing a flow path for said ink from said reservoir means through said manifold means, and at least one marking member extending from a portion of said manifold means for applying said ink to the covers of said books.

6. The apparatus of claim 1, wherein said removal means are disposed below said marking surface and comprises a removal conveyor means having a first end and a second end for transporting the at least partially coated books away from marking surface.

7. The apparatus of claim 6, wherein said marking means comprises reservoir means for retaining an ink, refill means connected to said reservoir means for supplying and refilling said reservoir means with said ink, manifold means connected to said reservoir means for providing a flow path for said ink from said reservoir means through said manifold means, and at least one marking member extending from a portion of said manifold means for applying said ink to said covers of said books.

8. The apparatus of claim 7, wherein said plurality of marking members comprise felt-tip markers.

9. The apparatus of claim 7, wherein said plurality off marking members comprise roller-tip marking devices.

10. The apparatus of claim 7, wherein said marking means comprises signal means for providing a warning signal when the ink needs to be refilled.

11. The apparatus of claim 7, further comprising a housing, said housing at least partially enclosing said transport means and said marking means.

12. The apparatus of claim 7, wherein said transport means comprises at least one endless conveyor belt and a roller conveyor arranged adjacent said conveyor belt.

13. The apparatus of claim 12, wherein said removal means comprises a removal conveyor means having an endless conveyor belt for receiving said at least partially coated books on said first end of said removal means and transporting said books toward said second end of said removal means away from said marking surface.

14. The apparatus of claim 12, wherein said transport means comprises singulating means for sorting through a plurality of books so that one book at a time is transported past said marking surface.

15. The apparatus of claim 1, further comprising a housing, said housing at least partially enclosing said transport means and said marking means.

* * * * *

UNITED STATES PATENT AND TRADEMARK OFFICE
CERTIFICATE OF CORRECTION

PATENT NO. : 5,281,273
DATED : January 25, 1994
INVENTOR(S) : Michael Emposimato, et. al.

It is certified that error appears in the above-indentified patent and that said Letters Patent is hereby corrected as shown below:

Column 8, line 37, delete alphabet letter "0" and subsitute numeric zero --0--
Column 9, line 3, delete "91" and substitute --9--.
Column 12, line 1, delete "off" and substitute --of--.

Signed and Sealed this

Twenty-eighth Day of June, 1994

Attest:

BRUCE LEHMAN

Attesting Officer      Commissioner of Patents and Trademarks